United States Patent Office 3,336,190
Patented Aug. 15, 1967

3,336,190
METHOD OF PROTECTING THE OFFSPRING OF A HERD OF BREEDING SWINE FROM TURBINATE ATROPHY
William P. Switzer, Ames, Iowa, assignor to Iowa State University Research Foundation, Inc., Ames, Iowa, a corporation of Iowa
No Drawing. Filed Nov. 19, 1963, Ser. No. 324,857
11 Claims. (Cl. 167—53)

This invention relates to a method of protecting the offspring of a herd of breeding swine from turbinate atrophy. More particularly, this invention has application to protection against turbinate atrophy resulting from the infection of the nasal cavities of baby pigs with certain bacterial organisms including *Bordetella bronchiseptica* and *Pasteurella multicida*.

The condition of "turbinate atrophy" in swine has been recognized for many years. It is a disease of the nasal cavities, which is sometimes referred to as "atrophic rhinitis." Certain bacterial organisms have been demonstrated as capable of causing turbinate atrophy. These include *Pasteurella multicida* and *Bordetella bronchiseptica*. Not only does the disease cause stunting and atrophy of the delicate nasal turbinate bones, but it also has the very undesirable economic effect of retarding the rate of growth of affected pigs. Consequently, there has been a widely recognized need for a method of protecting baby pigs from the growth-retarding effects associated with the condition of turbinate atrophy.

This problem of turbinate atrophy in baby pigs is particularly acute because of the prevalence of the organisms which cause the disease in the nasal cavities of mature swine, including the sows, gilts, and boars of breeding herds. Even surgically-derived breeding herds have been found to be infected with *Bordetella bronchiseptica* rhinitis and other related infections causing turbinate atrophy. While certain antibiotics and sulfa drugs appear to be effective in vitro against organisms such as *Bordetella bronchiseptica* and *Pasteurella multicida*, no satisfactory therapy has heretofore been developed for controlling or preventing turbinate atrophy in swine. The problem of an effective treatment is further complicated by the fact that therapeutic levels of sulfa drugs, if administered to baby pigs or mature swine for more than a few days, produce severe toxic reactions, including kidney damage, anorexia, and even death of the animals.

It is, therefore, an object of this invention to provide a method of protecting baby pigs from the adverse effects of turbinate atrophy. A further related object is to provide this protection without incurring any toxic reactions in the baby pigs, or interfering with the rate of growth of the pigs. A further object is to provide these desirable results by a method which involves a minimum of expense and difficulty. Further objects and advantages will be indicated in the following detailed specification.

This invention is based in part on the discovery that sulfa drugs, or, more specifically, the sulfonamides, are apparently concentrated by some unknown bodily mechanism in the nasal secretions of swine, and that this "concentration" phenomenon permits the sulfonamide to be administered orally to swine at a low level which is nontoxic even for prolonged administration, while obtaining a therapeutic concentration of the sulfonamide in the nasal mucus membranes even though the blood levels of the drug are far below that which would normally be regarded as having appreciable therapeutic activity. It has been further discovered that the continued low level administration of a sulfonamide to mature swine can result in the substantially complete elimination of turbinate atrophy-causing organisms from the mucus membranes and secretions. While these discoveries may have application to the treatment of already-infected baby pigs, it is believed that they will find their most important application in connection with a method for preventing baby pigs from becoming infected by the turbinate atrophy-causing organisms, which method comprises the particular subject matter of the present application.

The method of this invention is preferably applied to a herd of breeding swine, which will normally include both male and female animals, and gilts as well as sows. However, the method can also be applied to the treatment of only the female animals, providing the sows or gilts are separated from the boars or other untreated animals in the breeding herd after being bred but prior to farrowing.

It will be understood that breeding swine are sexually-mature, and are normally of an age beyond which pigs are normally shipped to market. In the swine-raising practice of the United States, most pigs are marketed before they reach six months of age, while breeding swine, both male and female animals, are normally older than six months.

In practicing the method of this invention, there is orally administered to the breeding herd, or to the separated female animals, from 25 to 500 milligrams per 100 pounds of body weight per 24 hours of a sulfonamide therapeutic agent. The therapeutically-active sulfonamides include sulfanilamide, sulfadiazine, sulfamethazine, sulfathiazole, sulfapyridine, sulfaethoxypyridizine, and other derivatives of para-aminobenzene sulfonamide. Sulfamethazine, sulfaethoxypyridizine, and sulfathiazole are believed to be particularly desirable in practicing this invention. Most of the sulfonamides can be employed in the form of their acetylated derivatives, such as acetylsulfadiazine, acetylsulfamethazine, acetylsulfothiazole, etc. The sulfonamides are commonly employed in the form of more soluble salts, such as particularly their sodium salts or hydrochloride salts. In practicing the present invention, it is preferred that the sulfonamide be employed in a water-soluble form, that is, in the form in which the sulfonamide would normally be used for oral administration where the therapeutic action is to be achieved by absorption into the blood stream.

The sulfonamide should be administered for at least five days, and preferably 10 to 14 days. The administration should be completed prior to farrowing in order to protect the baby pigs from exposure to certain bacteria capable of causing turbinate atrophy, which bacteria would otherwise be transferred from dam to offspring. Because of the relatively low dosage level of the sulfonamide, the administration can be continued for five days or longer, as required, without encountering serious toxic reactions. While the toxicity level for a sulfonamide may vary somewhat for specific animals, it is believed that the method of practicing this invention will usually provide an adequate margin of safety between the effective levels for producing the desired result and levels which would be injurious to the swine being treated. Preferably, the oral administration is continued for at least ten days. Usually this length of administration will be sufficient to substantially eliminate one or more of the turbinate atrophy-causing organisms from the nasal passages of the breeding swine. If necessary, however, the treatment can be continued for longer periods, even up to 30 to 40 days. Usually, however, treatment periods of from one to three weeks will be sufficient.

By applying the method just described to a swine breeding herd, it is possible to protect the offspring of the herd from being infected with turbinate atrophy-causing organisms, and particularly with *Bordetella bronchiseptica* and *Pasteurella multicida*, both of which have been definitely established as causing the disease. The treatment is also believed to be effective against *Hemo-*

*philus suis*, which contributes to rhinitis symptoms and may sometimes be a cause of atrophy. Baby pigs which are farrowed after the treatment of the breeding herd do not come in contact with the disease-causing organisms, which otherwise would be transmitted to the baby pigs from the infected swine of the breeding herd. Consequently, it is important to achieve substantial elimination of the turbinate atrophy-causing organisms from the breeding swine, or at least from the separated female animals, prior to farrowing, and, as indicated above, this will normally require a continuation of the oral administration for five days and preferably 10 to 14 days. As previously indicated, the treatment should be completed prior to farrowing. The administration is preferably discontinued from 5 to 10 days prior to farrowing, and therefore the treatment should usually be started from 20 to 30 days before the sows are due for farrowing. As far as is presently known, the preferred or optimum range for the oral administration is from 75 to 300 milligrams of sulfonamide per 100 pounds of body weight per 24 hours.

In practicing the method of this invention, the desired level for the oral administration of the sulfonamide can be approximated with sufficient accuracy by administering the sulfonamide in admixture with a swine feed material or in the drinking water for the swine. Where the sulfonamide is combined with the complete breeding ration, the dosage within the desired range can usually be achieved by incorporating from 25 to 100 milligrams of the sulfonamide per pound of the ration. Since the swine will consume the ration in proportion to their body weight, it can be assumed that the swine will receive approximately the desired dosage. As a general rule, breeding swine will consume approximately 3 pounds of ration per 100 pounds of body weight per 24 hours. The exact ratio of feed intake to body weight will vary somewhat with the age of the swine. The quantity of water consumed by swine is usually also roughly proportional to body weight, or, more particularly, to the pounds of dry feed. For example, breeding swine will usually drink from 1.75 to 2 pounds of water per pound of feed. Consequently, the concentration in the drinking water can be approximately 50% of that in the feed to achieve the same dosage level. More specifically, the desired dosage can be approximated where the drinking water contains from about 100 to 400 milligrams of sulfonamide per gallon.

Breeding-type rations for swine are characterized by containing a lower percentage of protein than growing rations. Generally, breeding rations contain less than 15% protein by weight, while growing rations contain 16% or more protein and up to 18–19% protein for creep rations. Breeding swine are also sometimes fed protein supplements. For example, a protein supplement might be administered in an amount of one pound per day, and could therefore be used as a vehicle for the oral administration of the sulfonamide. For example, from .2 to .8 gram of sulfonamide might be incorporated in a pound of protein supplement for administration to breeding swine at the rate of one pound per day. Although this would not guarantee the exact dosage levels previously specified because of variations in body weight of the animals, it would provide a means of approximating a low level dosage which would come within the general concept of the present invention. The fact that some of the breeding swine would receive a higher dosage of the sulfonamide in relation to body weight than others of the breeding swine, would not be important so long as all of the swine receive enough of the sulfonamide to be effective without receiving an amount approaching the level of undue toxicity.

The method of this invention is further illustrated by the following specific examples:

EXAMPLE I

In practicing the method of this invention, a herd of breeding swine may be treated by either one of the following procedures:

*Procedure A.*—The sulfonamide, viz, sulfamethazine, sulfanilamide, sulfadiazine, sulfapyridine, or sulfaethoxypyridizine, is uniformly admixed with a breeding ration at the rate of 100 grams per ton. This medicated feed is given to the entire herd, starting at least 30 days prior to the earliest expected farrowing date. The feeding is continued for 14 days, after which time it is discontinued.

*Procedure B.*—Sulfathiazole is dissolved in the drinking water for the herd of breeding swine at the rate of 330 milligrams per gallon. Water is supplied to the swine 40 days prior to the earliest expected farrowing date. The administration is continued for 21 days and then stopped.

EXAMPLE II

A herd of surgically derived breeding swine was examined for manifestationss of rhinitis and turbinate atrophy. 48% of the swine were found to have some degree of turbinate atrophy. *Bordetella bronchiseptica* was positively identified in three of the sows. The three *Bordetella bronchiseptica* sows were removed from the herd and fed a ration containing 100 grams of sulfamethazine per ton. None of the sows were due for farrowing within 30 days. The treatment was continued for 13 days, after which the treatment was stopped and the sows returned to the herd. Three weeks after the treatment was stopped, the sows were reexamined and found to be free from *Bordetella bronchiseptica*.

EXAMPLE III

Six sows found to be infected with *Bordetella bronchiseptica* were removed from the breeding herd and placed on a feed containing 100 grams of sulfamethazine per ton. Samples of nasal secretions were collected from the sows at 3, 5 and 7 days after the start of the treatment. All six sows were negative for nasal Bordetella at each of the three sampling periods. The treatment was discontinued and the sows were returned to the breeding herd. Again samples for nasal Bordetella were taken 11 days after termination of treatment and found to be negative. The treatment was completed prior to the farrowing of the sows.

The procedure for identifying *Bordetella bronchiseptica* in the nasal secretions of the swine tested in Examples II and III is described in Veterinary Medicine, vol. 58, pp. 562–565, July 1963. This article also describes the procedure for identifying *Pasteurella multicida* and *Hemophilus suis*.

While in the foregoing specification this invention has been described in relation to certain specific embodiments thereof and many details have been set forth for the purpose of illustration, it will be apparent to those skilled in the art that the method of this invention is susceptible to additional embodiments and that many of the details described herein can be varied considerably without departing from the basic principles of the invention.

I claim:

1. The method of protecting the offspring of breeding swine from turbinate atrophy, comprising orally administering to the swine from 25 to 500 milligrams per 100 pounds of body weight per 24 hours of a sulfonamide therapeutic agent, continuing said administration for at least five days before the day of farrowing of said offspring and until the nasal secretions of said swine are substantially free of turbinate atrophy-causing organisms, and discontinuing said administration prior to the day of farrowing of said offspring.

2. The method of claim 1 wherein said sulfonamide is selected from the group consisting of sulfamethazine, sulfanilamide, sulfathiazole, sulfadiazine, sulfapyridine, and sulfaethoxypyridizine.

3. The method of claim 1 in which said sulfonamide is sulfamethazine.

4. The method of claim 1 in which said sulfonamide is sulfaethoxypyridizine.

5. The method of claim 1 in which said sulfonamide is sulfathiazole.

6. The method of protecting the offspring of a herd of breeding swine from turbinate atrophy, comprising orally administering to the swine in said herd from 75 to 300 milligrams per 100 pounds of body weight per 24 hours of a sulfonamide therapeutic agent, continuing said administration for at least 10 days before the farrowing of said offspring, and discontinuing said administration at least 5 days prior to the farrowing of any of said offspring.

7. The method of claim 6 in which said sulfonamide is selected from the group consisting of sulfamethazine, sulfanilamide, sulfathiazole, sulfadiazine, sulfapyridine, and sulfaethoxypyridizine.

8. The method of claim 6 in which said sulfonamide is sulfamethazine.

9. The method of claim 6 in which said sulfonamide is sulfaethoxypyridizine.

10. The method of claim 6 in which said sulfonamide is sulfathiazole.

11. The method of protecting the offspring of a herd of breeding swine from turbinate atrophy, comprising orally administering to the swine in said herd from 75 to 300 milligrams per 100 pounds of body weight per 24 hours of a sulfonamide therapeutic agent, said administration being started at least 20 days prior to the earliest expected farrowing date, continuing said administration for at least 10 days, and discontinuing said administration at least 5 days prior to said earliest farrowing date.

References Cited

Arbeiter, Veterinary Bulletin, vol. 34, 1964, p. 109 (article of 1963).

Lukashev, Veterinary Bulletin, vol. 30, 1960, pp. 144–45.

SAM ROSEN, *Primary Examiner.*